(12) United States Patent
Steffes et al.

(10) Patent No.: US 10,101,712 B2
(45) Date of Patent: Oct. 16, 2018

(54) ENERGY STORAGE DEVICE CONTROL BASED ON COMMANDS FROM AN ELECTRICAL POWER DISTRIBUTION SYSTEM

(75) Inventors: Paul J. Steffes, Dickinson, ND (US); Thomas P. Steffes, Dickinson, ND (US); Austin P. Zeller, Dickinson, ND (US); Joe E. Fude, Dickinson, ND (US)

(73) Assignee: Steffes Corporation, Dickinson, ND (US)

( * ) Notice: Subject to any disclaimer, the term of this patent is extended or adjusted under 35 U.S.C. 154(b) by 1552 days.

(21) Appl. No.: 13/701,886

(22) PCT Filed: Apr. 27, 2012

(86) PCT No.: PCT/US2012/035348
§ 371 (c)(1),
(2), (4) Date: Jan. 3, 2013

(87) PCT Pub. No.: WO2012/149244
PCT Pub. Date: Nov. 1, 2012

(65) Prior Publication Data
US 2013/0096728 A1  Apr. 18, 2013

Related U.S. Application Data

(60) Provisional application No. 61/479,685, filed on Apr. 27, 2011, provisional application No. 61/570,526, filed on Dec. 14, 2011.

(51) Int. Cl.
G05B 13/02 (2006.01)
H02J 3/28 (2006.01)
(Continued)

(52) U.S. Cl.
CPC ............... G05B 13/02 (2013.01); H02J 3/14 (2013.01); H02J 3/28 (2013.01); H02J 3/32 (2013.01);
(Continued)

(58) Field of Classification Search
CPC .... G06Q 50/06; H02J 3/14; H02J 3/28; H02J 3/32; H02J 2003/146; Y02B 70/3225; Y04S 20/222; Y04S 20/224
(Continued)

(56) References Cited

U.S. PATENT DOCUMENTS 4,228,362 A   10/1980 Jacobs
4,317,049 A   2/1982 Schweppe
(Continued)

FOREIGN PATENT DOCUMENTS

DE   4337388 A1   5/1994
WO   2011127047 A2   10/2011
WO   2012149244 A1   11/2012

OTHER PUBLICATIONS

EPO Communication from corresponding European patent application No. 12721991.3, dated Sep. 2, 2014.
(Continued)

*Primary Examiner* — Robert E Fennema
*Assistant Examiner* — Jigneshkumar C Patel
(74) *Attorney, Agent, or Firm* — Brian D. Kaul; Westman, Champlin & Koehler, P.A.

(57) ABSTRACT

In a method of controlling energy consumption from an electrical power distribution system by energy storage devices, a first electrical load range for a first period in the future is communicated to the electrical power distribution system using a controller comprising a processor. A plurality of commands from the electrical power distribution system are received during the first period using the controller. A
(Continued)

rate of electrical energy consumption by the group of energy storage devices is adjusted during the first period to a value within the first electrical load range responsive to each of the commands using the controller. A portion of the energy consumed by the group of energy storage devices is then stored in energy storage mediums of the devices during the first period.

22 Claims, 4 Drawing Sheets

(51) Int. Cl.
  *H02J 3/14* (2006.01)
  *H02J 3/32* (2006.01)
(52) U.S. Cl.
  CPC ..... *H02J 2003/146* (2013.01); *Y02B 70/3225* (2013.01); *Y04S 20/222* (2013.01); *Y04S 20/224* (2013.01)
(58) Field of Classification Search
  USPC ........................................................ 700/291
  See application file for complete search history.

(56) References Cited

U.S. PATENT DOCUMENTS

| | | | |
|---|---|---|---|
| 4,337,388 A | 6/1982 | July | |
| 4,348,668 A | 9/1982 | Gurr et al. | |
| 4,449,178 A | 5/1984 | Blau, Jr. et al. | |
| 5,274,571 A * | 12/1993 | Hesse | G05D 23/1923 700/276 |
| 5,956,462 A | 9/1999 | Langford | |
| 5,968,393 A | 10/1999 | Demaline | |
| 6,080,971 A | 6/2000 | Seitz et al. | |
| 6,826,356 B1 | 11/2004 | Wanecski | |
| 6,900,556 B2 | 5/2005 | Provanzana et al. | |
| 7,010,363 B2 | 3/2006 | Donnelly et al. | |
| 7,149,605 B2 | 12/2006 | Chassin et al. | |
| 7,199,482 B2 | 4/2007 | Hopewell | |
| 7,346,274 B2 | 3/2008 | Bradenbaugh | |
| 7,420,293 B2 | 9/2008 | Donnelly et al. | |
| 7,567,751 B2 | 7/2009 | Fabrizio | |
| 7,715,951 B2 | 5/2010 | Forbes, Jr. et al. | |
| 8,010,240 B2 | 8/2011 | Mattiocco et al. | |
| 8,073,573 B2 | 12/2011 | Chassin et al. | |
| 8,121,742 B2 | 2/2012 | Flohr et al. | |
| 8,367,984 B2 | 2/2013 | Besore et al. | |
| 2002/0128747 A1 | 9/2002 | Mima | |
| 2002/0147529 A1 * | 10/2002 | Johnson | B60L 15/2045 700/286 |
| 2004/0010649 A1 * | 1/2004 | Weaver | H02J 9/00 710/302 |
| 2004/0225648 A1 * | 11/2004 | Ransom | G01D 4/004 |
| 2005/0187727 A1 | 8/2005 | Weik et al. | |
| 2007/0145952 A1 | 6/2007 | Arcena | |
| 2007/0271006 A1 | 11/2007 | Golden et al. | |
| 2008/0167756 A1 | 7/2008 | Golden et al. | |
| 2008/0185451 A1 | 8/2008 | Simon et al. | |
| 2009/0105888 A1 | 4/2009 | Flohr et al. | |
| 2009/0187499 A1 | 7/2009 | Mulder et al. | |
| 2009/0195070 A1 | 8/2009 | Takegami et al. | |
| 2010/0004790 A1 | 1/2010 | Harbin et al. | |
| 2010/0072817 A1 | 3/2010 | Hirst | |
| 2010/0094470 A1 | 4/2010 | Besore et al. | |
| 2010/0187219 A1 | 7/2010 | Besore et al. | |
| 2010/0204849 A1 | 8/2010 | Steffes et al. | |
| 2010/0218027 A1 | 8/2010 | Boss et al. | |
| 2010/0289451 A1 | 11/2010 | Tuffner et al. | |
| 2011/0057617 A1 * | 3/2011 | Finberg | H02J 7/0016 320/118 |
| 2011/0082598 A1 | 4/2011 | Boretto et al. | |
| 2011/0147360 A1 | 6/2011 | Hammerstrom | |
| 2011/0172837 A1 | 7/2011 | Forbes, Jr. | |
| 2011/0184575 A1 * | 7/2011 | Kawamoto | H04L 67/125 700/292 |
| 2011/0245987 A1 | 10/2011 | Pratt et al. | |
| 2013/0096728 A1 | 4/2013 | Steffes et al. | |

OTHER PUBLICATIONS

Steffes, Paul, P.E. "Grid-Interactive Electric Thermal Storage (GETS) Space and Water Heating", http://www.steffes.com/LiteratureRetrieve.aspx?ID=115580, date unknown, 6 pages.
International Search Report and Written Opinion of PCT/US2012/035348, dated Aug. 21, 2012.
U.S. Appl. No. 61/479,685, filed Apr. 27, 2011.
U.S. Appl. No. 61/570,526, filed Dec. 14, 2011.
Article entitled, "Smart Electric Newsletter #3", http://www.smartelectricnews.com, (2008), 9 pages, First Conferences Ltd.
Article entitled, "Earth Notes: A Note on the Potential Value of "Dynamic Demand" Control", http://www.earth.org.uk/note-on-dynamic-demand-value.html, May 17, 2009, 9 pages.
Article entitled, "Dynamic Demand (Electric Power)", http://en.wikipedia.org/wiki/Dynamic_demand_(electric_power), May 17, 2012, 4 pages.
Article entitled, "Dynamic Demand: Best Kept Energy Secret?", http://www.bbc.co.uk/blogs/ipm/2008/11/dynamic_demand_best_kept_energ.shtml#comments, May 17, 2012, 3 pages.
Examiner's Report for corresponding Canadian Patent Application No. 2,801,938, dated Mar. 20, 2015.
Examiner's Report for corresponding Australian Patent Application No. 2012249617, dated Jun. 17, 2015.
Examiner's Report dated Mar. 17, 2016 for corresponding Canadian Patent Application No. 2,801,938, filed Apr. 27, 2012.
A. Brooks et al: "Demand Dispatch", IEEE Power and Energy Magazine, vol. 8, No. 3, pp. 20-29, May-Jun. 2010.
Examiner's Report dated May 15, 2018 for corresponding Canadian Patent Application No. 2,973,287, filed Apr. 27, 2012.

* cited by examiner

ENERGY STORAGE DEVICE CONTROL BASED ON COMMANDS FROM AN ELECTRICAL POWER DISTRIBUTION SYSTEM

CROSS-REFERENCE TO RELATED APPLICATION

This Application is a Section 371 National Stage Application of International Application No. PCT/US2012/035348, filed Apr. 27, 2012 and published as WO 2012/149244 A1 on Nov. 1, 2012, and claims the benefit of U.S. Provisional Application Ser. No. 61/479,685, filed Apr. 27, 2011 and U.S. Provisional Application Ser. No. 61/570,526, filed Dec. 14, 2011 under 35 U.S.C. § 119(e), the contents of which are hereby incorporated by reference in their entirety.

BACKGROUND

For some electrical power distribution systems, balancing power generation with energy demands (i.e., load) can be challenging, particularly when the electrical power distribution systems are connected to electrical power generating systems having a variable power output, such as wind power generators and solar power generators. For instance, wind power generators generate electrical energy outputs that vary widely depending on the wind speeds. Additionally, the power generated by such systems cannot be easily controlled by adding or removing wind turbines responsive to the energy load on the system.

As a result, variable output power generators often generate electrical energy that exceeds the demand on the electrical power distribution systems, such as during high wind conditions at off-peak power demand times. Such excess energy may be wasted if the load on the electrical power distribution system is not adjusted.

For many years electrical power distribution systems have controlled energy consuming devices through a communication that turns the devices on or off. Typically, this control is used to reduce the power demand on electrical power distribution system peak power consumption periods, as described in U.S. Pat. No. 8,010,240. U.S. Pat. No. 8,121,742 discloses an energy distribution system that controls the activation and deactivation of a group of water heaters for the purpose of controlling the load on the grid. This activation and deactivation of groups of electrical devices by the electrical power distribution system is conducted without actual knowledge of how it may affect the energy demands placed on the electrical power distribution system. Accordingly, control of the actual energy demand using these techniques is limited.

Embodiments described herein provide solutions to these and other problems, and offer other advantages over the prior art.

SUMMARY

Some embodiments in the invention are directed to methods of controlling energy consumption from an electrical power distribution system by energy storage devices and systems for carrying out the methods. In some embodiments of the method, a first electrical load range for a first period in the future is communicated to the electrical power distribution system using a controller comprising a processor. A plurality of commands from the electrical power distribution system are received during the first period using the controller. A rate of electrical energy consumption by the group of energy storage devices is adjusted during the first period to a value within the first electrical load range responsive to each of the commands using the controller. A portion of the energy consumed by the group of energy storage devices is then stored in energy storage mediums of the devices during the first period.

In other embodiments of the method, the group of energy storage devices are controlled at the onset of a first period to consume power from the electrical power distribution system using a controller comprising a processor. A command is received from the electrical power distribution system during a current interval of the first period using the controller. A rate of electrical energy consumption by the group of energy storage devices is adjusted during the next interval of the first period based on the command using the controller. A portion of the energy consumed by the group of energy storage devices is then stored in energy storage mediums of the devices during the interval. The receiving, adjusting and storing steps are then repeated until the expiration of the first period.

Other features and benefits that characterize embodiments of the present disclosure will be apparent upon reading the following detailed description and review of the associated drawings.

DETAILED DESCRIPTION OF ILLUSTRATIVE EMBODIMENTS

Some embodiments of the invention are directed to methods of controlling energy consumption by energy storage devices and systems for carrying out the methods. In some embodiments, the electrical energy consumption of a group of energy storage devices is controlled to meet load demands of an electrical power distribution system. In some embodiments, this is accomplished by determining in advance an amount of energy load that can be provided to an electrical power distribution system by the devices and communicating the amount to the electrical power distribution system. In some embodiments, this control of the group of devices can also take into consideration the energy needs of the devices to meet the demands of the users of the devices.

Figure 1:
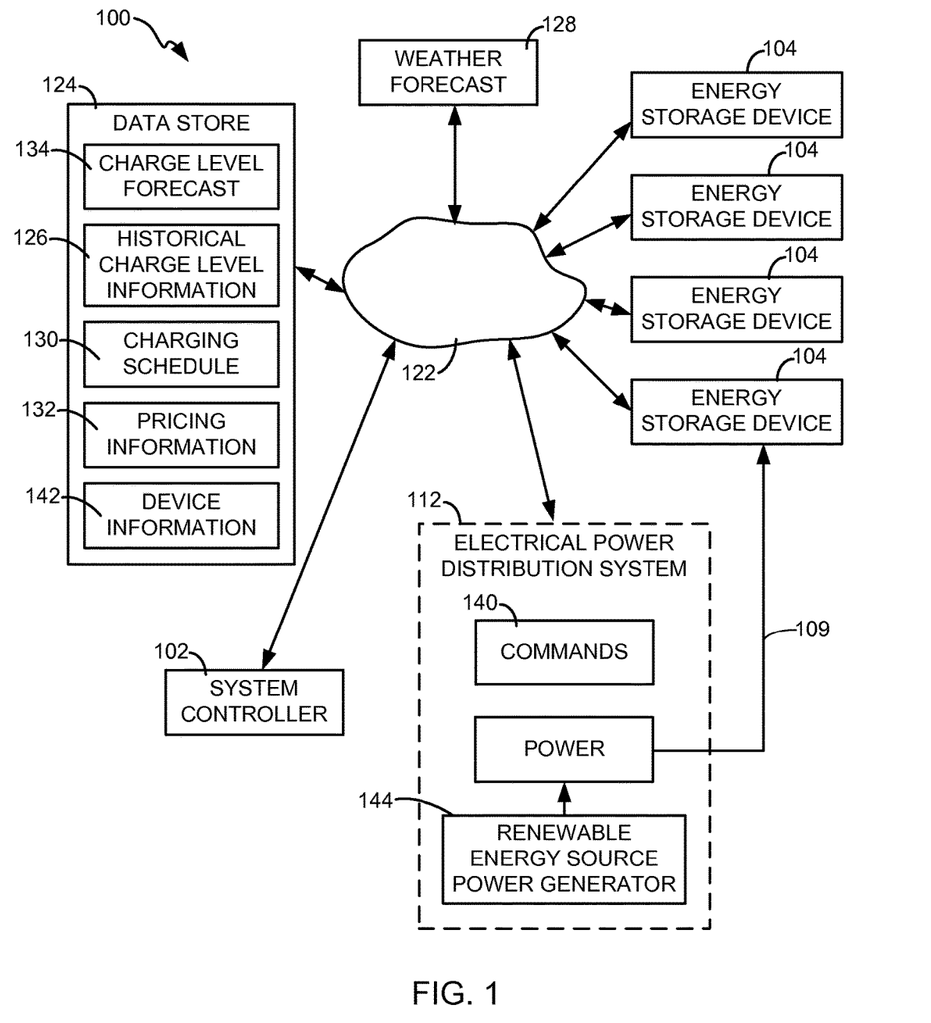
FIGS. 1 and 2 are simplified diagrams of a system in accordance with embodiments of the invention.
Figure 2:
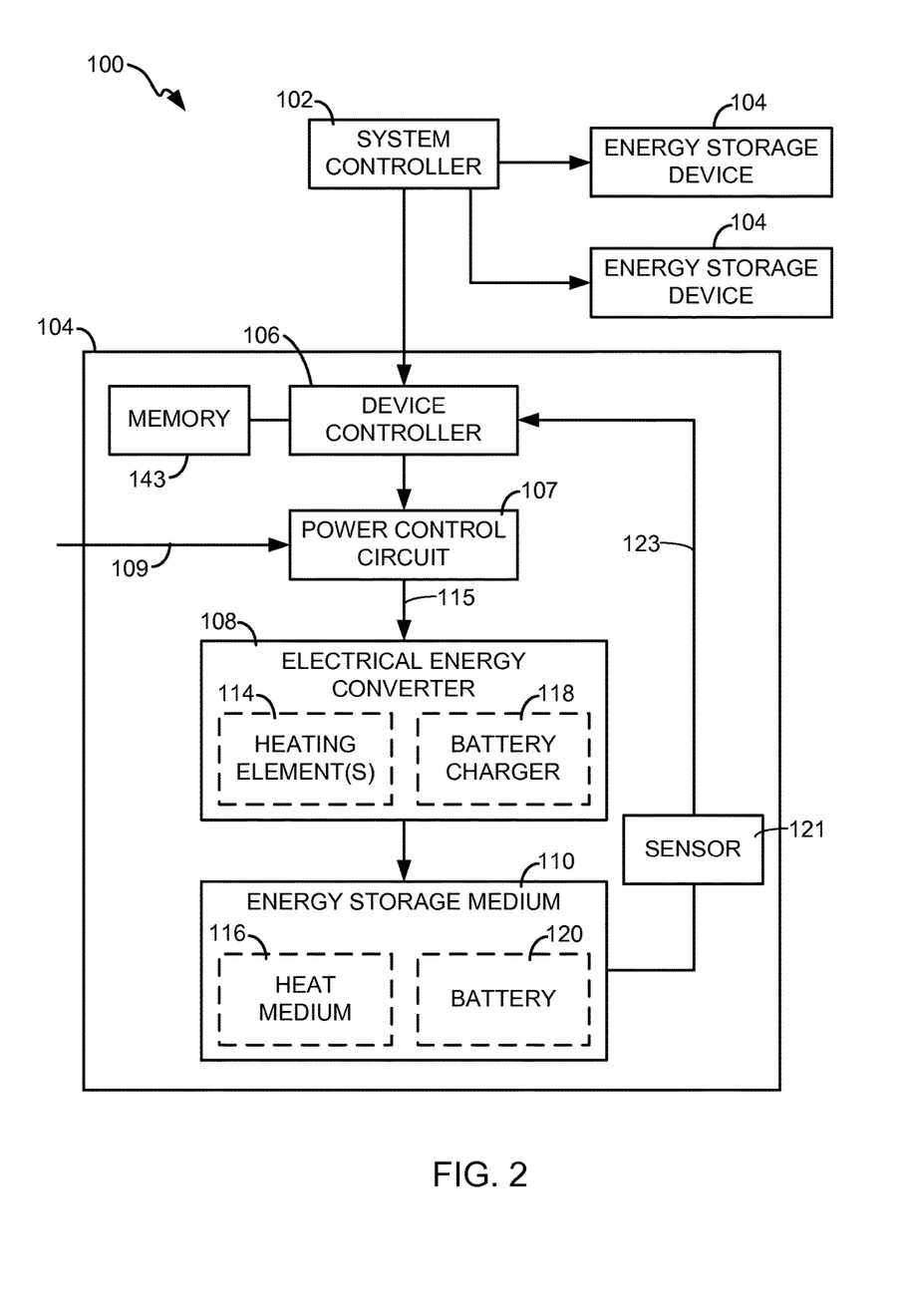

FIGS. 1 and 2 are simplified diagrams of a system 100 in accordance with embodiments in the invention. The system 100 generally includes a system controller 102 and a plurality of energy storage devices 104. In some embodiments, each energy storage device 104 includes a device controller 106, a power control circuit 107, an electrical energy converter 108 and/or an energy storage medium 110. The devices 104 each receive power 109 from an electrical power distribution system 112.

In some embodiments, the power control circuit 107 (FIG. 2) delivers a portion of the power 109 received from the electrical power distribution system 112 to the electrical energy converter 108 in the form of a power signal 115. In some embodiments, the power signal 115 is controlled by the device controller 106 and/or the system controller 102 to thereby control the amount of the power 109 consumed by the device 104.

The electrical energy converter 108 converts the power 115 into an energy form that is stored by the energy storage medium 110. In some embodiments, the energy converter 108 includes a heating device having one or more heating elements 114 that convert the electrical energy 115 received from the electrical power distribution system 112 into heat. The heat produced by the heating elements 114 is stored in a heat medium 116. The heating elements 114 may be located within or adjacent to the heat storage medium 116. The heating elements 114 can take on any conventional form that is suited to heating the medium 116. Exemplary heating elements 114 include resistive heating elements, such as heating coils, and other electrical heating elements.

Embodiments of the heat storage medium 116 include liquid and solid mediums. Exemplary liquid heat storage mediums 116 include water, oil and other conventional liquid heat storage mediums. In some embodiments, the heat storage medium 116 is water and the energy storage device 104 is in the form of a water heater. Exemplary solid heat storage mediums 116 include ceramic bricks, rocks, and other conventional solid heat storage mediums. In one exemplary embodiment, the energy storage device 104 is in the form of a space heater utilizing a solid heat storage medium 116, such as ceramic bricks.

In accordance with another embodiment, the energy storage devices 104 include a battery charging device having a battery charger 118 that converts the electrical power 115 received from the distribution system 112 into energy that is stored in a battery 120. The battery charger 118 and the battery 120 can be formed in accordance with conventional components. In some embodiments, the battery 120 represents one or more batteries, such as an array of batteries used to power an electric vehicle. In some embodiments, the battery 120 is an electro-chemical battery.

One embodiment of the system controller 102 includes one or more processors, such as microprocessors, that are configured to execute program instructions stored in memory of the system controller 102, such as a tangible computer storage medium (e.g., RAM, ROM, flash memory, etc.), or memory that is accessible by the system controller 102, to perform method steps and function in accordance with embodiments of the invention described herein. Likewise, the embodiments of the device controller 106 include one or more processors and accessible memory containing program instructions that are executable by the one or more processors to perform method steps and functions in accordance with embodiments of the invention described herein. In some embodiments, the system controller 102 performs functions of the device controller 106 described herein.

In some embodiments, the system controller 102 and the device controller 106 communicate through a conventional communication link. The communication link may be a physical communication link (wire, optical cable, etc.) or a wireless communication link (radio frequency, wireless network, etc.) in accordance with conventional communication methods. In some embodiments, the system controller 102 communicates with the device controller 106 through a conventional network 122. In some embodiments, the system controller 102 is configured to communicate with a remote data store, such as the database 124, over the network 122 or other conventional data communication link. In some embodiments, the system controller 102 is configured to communicate with the electrical power distribution system 112 through the network 122 or other suitable data communication link.

In some embodiments, the system controller 102 is independent of the electrical power distribution system 112. The system controller 102 controls the rate of consumption of electrical energy 109 from the electrical power distribution system 112 by a group of the energy storage devices 104. In some embodiments, the system controller 102 controls the aggregated rate of energy consumption by the group of energy storage devices 104. The specific group of energy storage devices 104 controlled by the system controller 102 can be selected as desired. Embodiments of the group of devices 104 include more than 10 devices 104, more than 100 devices 104, and more than 1000 devices 104.

In some embodiments, the system controller 102 communicates command signals to the devices 104. In some embodiments, the rate of energy consumption by each of the devices 104 is set based on command signals received by the device 104. More specifically, the rate of consumption of the electrical energy 109 supplied from the electrical power distribution system 112 by the electrical energy converter 108 is controlled responsive to received command signals from the system controller 102. In some embodiments, the commands from the system controller 102 are received by the device controllers 106, which controls the rate of electrical energy consumption by the corresponding device 104 based on the commands.

In some embodiments, the device controller 106 adjusts a duty cycle of the power 115 provided to the electrical energy converter 108 responsive to the command signal through control of the power control circuit 107. Thus, the device controller 106 may increase the duty cycle of the electrical power 115 supplied to the converter 108 from the power control circuit 107 resulting in an increase in the rate of energy consumption by the device 104. This increase in the rate of energy consumption by the converter 108 results in an increase in the charge rate of the medium 110, such as an increase in the heating rate of the heat medium 116 or an increase in the charging rate of the battery 120, for example. Likewise, the controller 106 may decrease the duty cycle of the electrical power to the converter 108 resulting in a decrease in the rate of energy consumption by the device 104 and a decrease in the charge rate of the medium 110. Other techniques for controlling the amount of energy consumed by the device 104 based on a command may also be used. Thus, the system controller 102 controls the rate of energy consumption of the group of devices 104 through the control of the rate of energy consumption by the individual devices 104.

In some embodiments, the devices 104 include at least one sensor 121 that is configured to sense a parameter of the energy storage medium. A signal 123 indicative of a value of the sensed parameter is communicated to the device controller 106, and/or the system controller 102. The communication of the signal 123 or the value indicated by the signal 123 may be communicated to the system controller 102 from the device controller 106. In some embodiments, commands issued by the system controller 102 for a particular device 104 that indicate a charging rate for the device 104 are based on the sensor output signal 123.

The sensed parameter output by the sensor 123 may be used by the device controller 106 in accordance with conventional device controllers. For instance, when the converter 108 is in the form of a heating element 114, the device controller 106 may receive temperature signals that indicate a temperature of the heat medium 116 and use the temperature signals to control the heating element 114. When the electrical energy converter 108 is in the form of a battery charger 118, the device controller 106 may receive charge level information in the form of voltage or current measurement values from the sensor 121 and control the electrical energy converter 108 in accordance with conventional battery charger controllers.

In some embodiments, the device controller 106 is configured to communicate with one or more data stores 124, such as a database. In some embodiments, the data store 124 is remote from the device controller 106, which communicates with the data store 124 through, for example, the network 122 or other suitable data communication link. The device controller 106 can receive information from the database 124 or deliver information for storage in the database 124.

In some embodiments, the device controller 106 and/or the system controller 102 logs device information 142 regarding each of the devices 104 in the data store 124 and/or within memory 143 of the devices 104. Embodiments of this device information include, for example, the energy usage of the device 104, the charge level of the energy medium 110 (e.g., the temperature of the heat medium 116 or the electrical energy storage level of the battery 120), the energy storage capacity of the medium 110, the remaining energy storage capacity of the medium 110, a target charge level of the medium 110, and other information.

In some embodiments, the system controller 102 sets the rate of electrical energy consumption or charge rate for the group of energy storage devices 104 for future time periods. The time periods can be any desired time period. In accordance with some embodiments, the time period is one hour. Other time periods, such as 0.5 hours, 1.5 hours, etc., may also be used. Thus, one embodiment of the controller 102 sets the rate of electrical energy consumption or charge rate for the group of energy storage devices 104 for consecutive time periods in the future. For instance, the charge rate for the group of devices 104 may be set to 1 megawatt for a time period of $t_0$-$t_1$, and adjusted to 1.3 megawatts for the time period $t_1$-$t_2$, and adjusted to 1.1 megawatts for the time period $t_2$-$t_3$, etc. In some embodiments, the charge rate that is set for a given time period is an average aggregate charge rate for the group of devices.

In some embodiments, the aggregated charge rate set by the system controller 102 for the group of energy storage devices 104 is unevenly divided among the individual devices 104 of the group. That is, the energy storage devices 104 may individually consume energy from the electrical power distribution system 112 at different rates than other devices 104 within the group.

In some embodiments, the charge rate set for an individual device 104 is based upon the charge level of the energy storage medium 110 relative to the charge levels of the energy storage mediums 110 of the other devices 104 in the group. The charge levels of the devices 104 can be obtained by the controller 102 from the individual devices 104 or from the device information 142 in the data store 124.

In some embodiments, the controller 102 assigns a higher energy consumption or charge rate to the energy storage devices 104 whose energy storage mediums 110 have a low charge level relative to the charge levels of the other energy storage devices 104 in the group. For instance, when the energy storage medium 110 is in a form of the heat medium 116, energy storage devices 104 whose heat mediums 116 are at a relatively low charge level (i.e., low temperature) would be assigned a higher charge rate than the energy storage devices 104 whose heat mediums 116 are at a higher charge level (i.e., high temperature). Similarly, when the energy storage medium 110 is in the form of a battery 120, the energy storage devices 104 whose battery 120 are at a relatively low charge level (i.e., low level of energy storage), will be assigned a higher charge rate than the energy storage devices 104 whose battery 120 are at a higher charge level (i.e., high level of energy storage).

In accordance with another embodiment, the controller assigns a charge rate to the individual devices 104 within the group based upon a charge deficit of the device 104, which generally indicates a remaining energy storage capacity of the energy storage medium 110 of the device. In some embodiments, the charge deficit of the device 104 is the difference between the charge level of the energy storage medium 110 of the device and a target charge level or a maximum charge level for the energy storage medium 110 of the device 104. The target charge level represents a desired level of charge for the medium 110 for the time period, which is set, for example, based on the needs of the owner of the device. For instance, when the device 104 is in the form of a water heater, the target charge level or water temperature is set based on the hot water needs of the owner. In some embodiments, the charge deficit for the devices 104 is calculated based on the current charge level of each of the devices 104 and the target charge level for each of the devices 104. This information may be obtained by the controller 102 from the device information 142 stored in the data store 124, or from the individual devices 104. Alternatively, the charge deficit for each of the devices may be continuously updated and stored in the data store 124 or the memory 143 by the controller 102 or the controller 106.

In some embodiments, the controller 102 sets the energy storage devices 104 having a relatively high charge deficit to consume energy at a higher rate than the energy storage devices 104 having lower charge deficit. This biases the distribution of the energy from the power distribution system 112 to the devices 104 having the greatest need. Thus, when the charge deficit is large for a given device, the controller 102 will weigh the need of the device 104 to consume energy when assigning the charge rate for the device 104 within the group.

In some embodiments, the target charge level is anticipated for each device 104 based on historical charge level information 126 that is accessible by the system controller 102 from the data store 124, or from local memory 143 of the devices 104. The historical charge level information 126 provides a forecast as to the energy needs of an individual storage device 104 over a given time period. For instance, when the energy storage device 104 is in the form of a heating device, the charge level of the heat medium 116 may need to be higher at times of greater heat discharge from the heat medium 116 to, for example, heat water used by a household. Thus, the charge rate set for individual devices 104 may be based upon a difference between the charge level of the energy storage medium 110 and the target charge level for the energy storage medium 110. The devices 104 having a larger difference between the target charge level and the current charge level of the medium 110 may be assigned a higher charge rate than the devices 104 having a lower difference between the target charge level and the current charge level of the medium 110.

The historical charge level information 126 may also be considered as an indicator of the use (i.e., energy output) of the device 104 for the delivery of energy from the energy storage medium 110. For instance, the information 126 may indicate the delivery of heat from the medium 110 for use in a home, for example. This discharge of heat from the medium 110 is useful in assessing the charge level of the medium 110 that is required to satisfy the needs of the user of the device 104.

In some embodiments, the aggregate charge rate for the group of the devices 104 or the charge rate for individual devices 104 assigned by the system controller 102 may also be based on weather forecast information 128. The weather forecast information 128 may be acquired by the system controller 102 from a website or other conventional source. In some embodiments, the weather forecast information 128 may be stored in a data store 124 or stored in local memory that is accessible by the system controller 102. The weather forecast information 128 may be used to determine whether the charge level of one or more of the energy storage devices 104 should be adjusted for a given time period. For instance, when the device 104 is in the form of a heating device and the weather forecast information 128 indicates that a temperature for a given future time period will be either lower or higher than normal, the target charge level for the heat medium 116 for the time period may be adjusted based upon an estimated change in the demand for heat output from the heat medium 116 during the time period. Other information can also be used by the system controller 102 in determining the aggregate charge rate for the group of energy storage devices 104.

In some embodiments, the aggregate charge rate set by the system controller 102 for the energy storage devices 104 is based on a charging schedule 130 that may be accessed by the system controller 102. The charging schedule 130 may be stored in the data store 124, or other location where it may be accessed by the system controller 102. The charging schedule 130 generally identifies the periods of time when the energy storage devices 104 will be activated to consume electrical power from the electrical power distribution system 112. The charging schedule 130 may also indicate charge rates for the devices 104 for the time periods. The charging schedule 130 may be manually set by the administrator of the system by programming the charging schedule 130 as desired. In some embodiments, the charging schedule 130 for a given day may be adjusted during the day.

In some embodiments, the charging schedule 130 for a given day may be set based on pricing information 132 for electricity from the electrical power distribution system 112 for the given day. The pricing information 132 preferably sets out time-based pricing information for electricity from the distribution grid 112. In some embodiments, the pricing information 132 is accessible by the system controller 102 for setting the charging schedule 130. The pricing information may be stored in a remote data store, such as the database 124, or other location accessible by the system controller 102. As a result, the system controller 102 can set the charging schedule 130 for a given day such that the devices 104 are activated to consume energy supplied by the electrical power distribution system 112 during periods of time where the electricity supplied by the electrical power distribution system 112 is at its lowest price, while avoiding activation of the devices 104 when the electricity is more expensive. Thus, the system controller 102 can set the charging schedule 130 to have more or fewer periods when the devices 104 within the group are activated depending on the pricing information 132.

In some embodiments, the system controller 102 adjusts the charging schedule 130 for time periods in a given day that are more than 90 minutes away based on the charge levels of the devices 104. For instance, the charging schedule 130 may be adjusted if the charge levels of the devices 104 would exceed their capacity, or if the charge levels of the devices 104 are too low to satisfy the needs of the user.

In some embodiments, the system controller 102 generates a charge level forecast or schedule 134 that identifies the charge level that each of the devices 104 should have at the beginning of future time periods. The charge level forecast 134 may be stored in local memory that is accessible by the system controller 102, or in a remote data store 124, as shown in FIG. 1. In some embodiments, the charge level forecast 134 for a given energy storage device 104 is based upon the current charge level of the device 104, anticipated charge levels of the device 104 that precede the specific interval, the weather forecast information 128, the historical charge level information 126 and/or the charging schedule 130. As this information changes, the charge level forecast for a specific future time interval for a device 104 may be adjusted by the system controller 102. In some embodiments, the charge rate set by the system controller 102 for the energy storage devices 104 for a given time interval is based on the charge level forecast 134 and the charging schedule 130.

In some embodiments, the charge level forecast 134 for the devices 104 is monitored by the system controller 102 to ensure that the charge levels of the devices 104 do not drop below a minimum threshold or exceed a maximum threshold. In some embodiments, if the charging level for any of the devices 104 is forecasted to fall outside the minimum or maximum thresholds of the device, the system controller 102 can adjust the charging schedule 130 and the charge rate for the energy storage device 104 accordingly. The maximum and minimum charge levels can be obtained from stored information on each of the devices 104 in the data store 124 or other accessible location, such as in memory of the devices 104.

In some embodiments, the system controller 102 sets the aggregate charge rate in the forecast 134 for the group of energy storage devices 104 for consecutive future time periods. In some embodiments, the charge rates are set for time periods of 1 hour. In accordance with another embodiment, the future time periods are each less than 2 hours. Other durations may also be used for the time periods.

In some embodiments, the system controller 102 sets the charge rate for a given time period a predetermined amount of time prior to the onset of the time period. In some embodiments, the charge rate for the group of energy storage devices 104 is set by the system controller more than 1 hour prior to the onset of the time period. In accordance with another embodiment, the system controller 102 sets the charge rate for the group of energy storage devices 104 approximately 2 hours before the onset of the time period.

While the goal of the charge rate assigned by the system controller 102 for a given time period for the group of devices 104, in accordance with some embodiments, is to have the devices 104 achieve the charge level for each of the devices 104 identified by the charge level forecast 130 by the beginning of the next time period, it is not critical that the devices 104 achieve this charge level. In some embodiments, it is acceptable to fall below the forecasted charge level or even exceed the forecasted charge level for the time period.

Once the aggregate charge rate for the group of energy storage devices 104 is set by the system controller 102 based on one or more of the factors described above, the distribution of the aggregate charge rate among the devices 104 may be adjusted. That is, each of the devices 104 may be monitored during the time period and adjustments can be made to the charge rates (rate of energy consumption) of the individual devices 104 based upon various factors, such as the charge level of the device 104 (i.e., the charge level of the device's medium 110) relative to the charge levels of the other devices 104 in the group, the charge deficit of the device 104 (i.e., difference between the current charge level of the device 104 and the target charge level for the device 104) as compared to the charge deficits of other devices 104 in the group, whether the charge levels of the devices 104 are exceeding a maximum charge level or falling below a minimum charge level, and/or other parameter.

In summary, the system controller 102 sets an aggregate charge rate for the energy storage devices 104 for consecutive future time periods throughout the day and stores the charge rate assignments for the devices 104 in the charging schedule 130, in accordance with some embodiments. The aggregate rate of energy consumption of the devices 104 in the group may be set by the system controller 102 based on various information, such as, historical charge level information 126, pricing information 132, weather forecast information 128 and/or a charge level forecast 134, for example. The aggregate charge rate or aggregate rate of energy consumption by the devices 104 within the group for a given period of time may be unevenly distributed among the devices 104 for the time period based on one or more factors described above. Additionally, adjustments may be made to the distribution of the aggregate rate of energy consumption among the devices 104 during the time period.

In some embodiments, the system controller 102 assists the electrical power distribution system or electrical grid 112 to provide a variable electrical load (i.e., rate of electrical consumption), which can assist the electrical power distribution system 112 to maintain the system within desired parameters. In general, the system controller 102 responds to commands 140 communicated from the electrical power distribution system 112 through the network 122 or other suitable communication path to follow a variable component of the grid, such as the need for fast regulation of the load, the need for load following, and the integration of large amounts of power generated by a renewable energy source power generator 144, for example.

The renewable energy source power generator 144 generates at least a portion of the power distributed by the electrical power distribution system 112, from a renewable energy source, such as wind, sunlight, rain, tides, water, geothermal heat or other renewable energy source. Power generated by the generator 144 may fluctuate significantly when the renewable source is, for example, wind or sun. Embodiments of the system 100 can quickly adjust the power consumed by the group of devices 104 to assist the electrical power distribution system 112 in absorbing and storing excess energy distributed by the system 112 and reducing the electrical load on the system 112 when necessary.

In some embodiments, the system 100 provides the variable electrical load during off-peak power demand periods, such as night when variable wind-generated energy can fluctuate significantly. Such wind-generated energy that would otherwise go unused may be stored by the devices 104.

Figure 3:
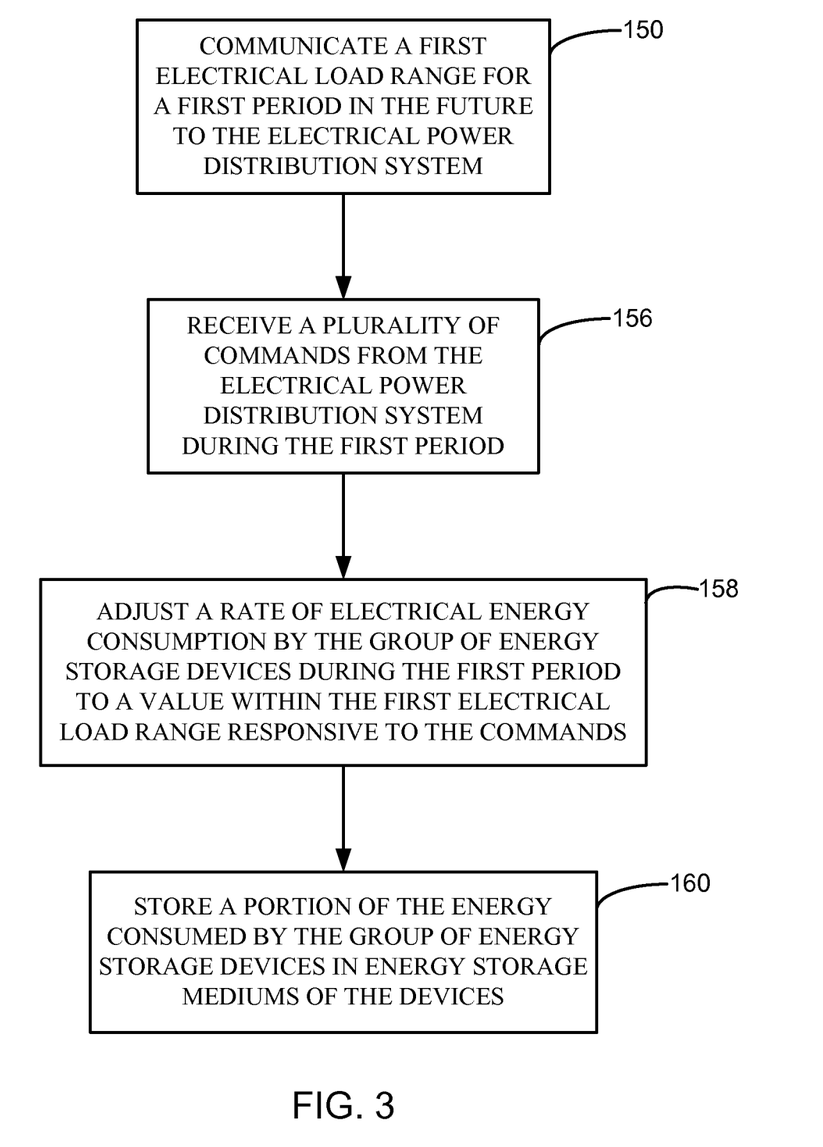
FIG. 3 is a flowchart illustrating a method of controlling electrical power consumption from an electrical power distribution system by a group of energy storage devices, in accordance with some embodiments of the invention.
Figure 4:
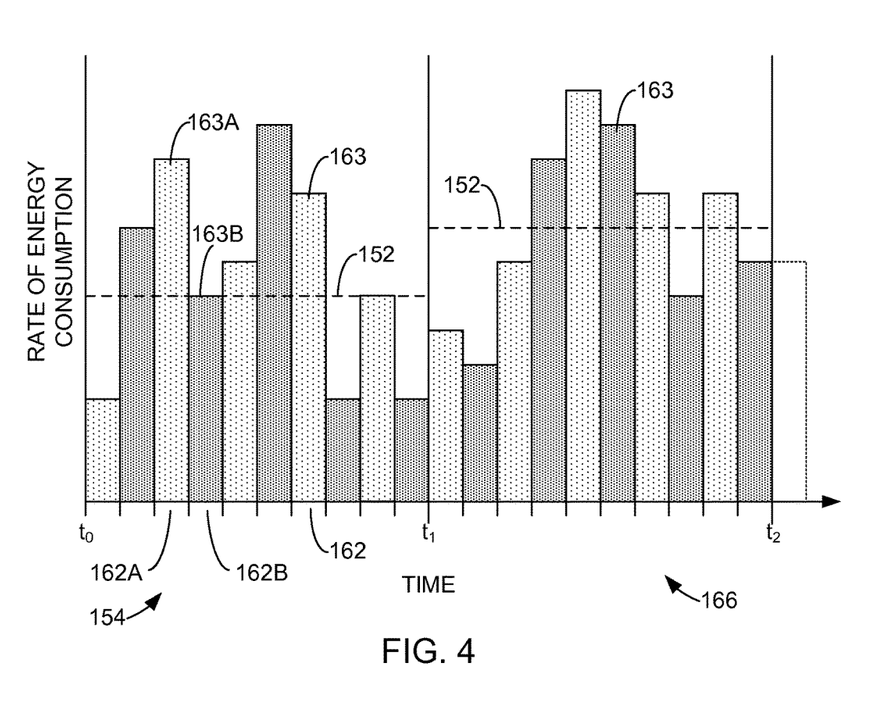
FIG. 4 is a chart illustrating aggregate rates of electrical energy consumption by the energy storage devices over time, in accordance with some embodiments of the invention.

FIG. 3 is a flowchart illustrating a method of controlling electrical power consumption from an electrical power distribution system 112 by a group of energy storage devices 104, in accordance with some embodiments of the invention. In some embodiments, the method is performed during an off-peak power consumption period, such as at night. FIG. 4 is a chart illustrating aggregate rates of electrical energy consumption by the energy storage devices 104 over time.

At 150 of the method, an electrical load range 152 (value indicated in FIG. 4) for a time period 154 (e.g., time $t_0$-$t_1$) in the future is communicated to the electrical power distribution system 112 using the system controller 102. In some embodiments, the electrical load range corresponds to the average aggregate rate of electrical power consumption that is desired for the group of energy storage devices 104. Thus, the electrical load range 152 may be set by the system controller 102 based upon one or more of the factors described above, such as the charging schedule 130, the charge level forecast 134, the device information 142, the weather forecast 128, pricing information 132, the charge deficits of the devices 104, and/or other information.

At 156 of the method, a plurality of commands 140 are received from the electrical power distribution system 112 during the first period 154 using the controller. At 158, a rate of electrical energy consumption by the group of energy storage devices 104 is adjusted during the first period 154 to a value within the first electrical load range 152 responsive to each of the commands 140 using the system controller 102.

At 160, a portion of the energy consumed by the group of energy storage devices 104 during the first period 154 is stored in the energy storage mediums 110 of the devices 104. As discussed above, when the energy storage medium 110 comprises a heat medium 116, the energy consumed by the devices 104 is stored as heat in the heat medium 116. When the energy storage medium 110 includes a battery 120, the energy consumed by the devices 104 during the first period 154 is stored as chemical energy in the battery 120.

In some embodiments, the time period 154 is divided up into intervals 162, each represented by the width of the bars in the chart of FIG. 4. In some embodiments, the intervals 162 are approximately equal segments of time spanning the time period 154. In some embodiments, the intervals 162 are less than 10 seconds each. For instance, a time period over which load regulation service will be provided by the system 100 of the present invention may be 1 hour having intervals 162 of 10 seconds or less, such as every 4 seconds. In accordance with another embodiment, the time period 154 is divided into intervals of 5 minutes each. Other longer or shorter time intervals may also be used.

In some embodiments of step 156 of the method, the plurality of commands 140 from the electrical power distribution system 112 are each received during a different interval 162 of the period 154. In one embodiment of step 156, the commands 140 are communicated to the system controller 102 in step 156 for a given interval in advance of the onset of the interval. In one embodiment of step 158 of the method, the rate of electrical energy consumption by the group of energy storage devices 104 during the first period 154 is adjusted for the next interval 162 in accordance with the command 140 received during the preceding interval 162. For instance, the rate of energy consumption 163B by the group of energy storage devices 104 consumed during the interval 162B is based on the command 140 received from the electrical power distribution system 112 by the controller 102 during the preceding interval 162A.

In some embodiments, each of the commands 140 issued by the electrical power distribution system 112 includes a commanded rate. In one embodiment of the adjusting step 158, the rate of electrical energy consumption 163 by the group of energy storage devices 104 is set to the commanded rate for the interval 162 of the period 154 corresponding to the command 140. In some embodiments, the commanded rate is within the range indicated by the electrical load range 152 communicated in step 150.

In some embodiments, the commanded rate indicates a specific rate of energy consumption, such as 4 kilowatts, that is within the range 152. In other embodiments, the commanded rate indicates a percentage adjustment from the electrical load range 152. For instance, the commanded rate may indicate a percentage from which the commanded rate of electrical energy consumption by the devices 104 can be determined based on the electrical load range 152. For instance, when the electrical load range 152 indicates a maximum electrical consumption rate for the period 154, the commanded rate may indicate a value of 0-100%, from which the desired energy consumption rate for the corresponding interval 162 can be determined. When the electrical load range 152 indicates a median aggregate rate of energy consumption by the devices 104, the commanded rate may indicate a value of −100-100% of the median value, from which the desired aggregate rate of energy consumption by the devices 104 can be determined. Thus, the rate of electrical energy consumption 163 in a given interval may exceed the rate indicated by the electrical load range 152, as shown in FIG. 4. When the electrical load range 152 indicates an average aggregate rate that is greater than half the maximum rate, adjustments may be made to ensure that the commanded rate does not exceed the maximum available rate.

In accordance with some other embodiments, the commands 140 may indicate a plurality of commanded rates, such as a zero rate, a commanded rate that is the nominal or base rate (e.g., an average rate indicated by the electrical load range 152), and a maximum available rate, for example.

In one embodiment of step 158, the controller 102 unevenly distributes the commanded rate among the energy storage devices 104 of the group. That is, the aggregate rate of energy consumption 163 corresponding to the commanded rate is divided up among the devices 104 such that some of the devices 104 consume higher amounts of electrical energy than other devices 104. This allows the electrical energy to be distributed among the devices 104 of the group based on their needs or other factors. In one embodiment, the system controller 102 accesses a charge deficit for each of the energy storage devices 104 from the data store 124 or other location and adjusts the rate of electrical energy consumption by each of the devices in step 158 based on the charge deficits. In one embodiment of step 158, the system controller sets higher rates of electrical energy consumption for the devices 104 having larger charge deficits than the devices 104 having lower charge deficits. In some embodiment, the controller 102 calculates the charge deficit for each of the energy storage devices based on their current charge levels and either a target charge level or a maximum charge level for the mediums 110 of the devices 104. This information may be received from the devices 104 through a communication with the controllers 106, or accessed from device information 142 stored in a data store 124.

In some embodiments of the method, the system controller 102 sets the electrical load range prior to communicating the load range to the electrical power distribution system 112. In one embodiment, the system controller 102 accesses a charge level forecast 134 for the group of energy storage devices 104 from a data store 124, or other location, and sets the electrical load range based on the charge level forecast. In some embodiments, the system controller 102 accesses a charging schedule 130 for the group of energy storage devices 104 and sets the electrical load range based on the charging schedule 130.

In some embodiments, the method described above is repeated for consecutive periods of time. Thus, after the expiration of the period 154, the method repeats steps 150, 156, 158 and 160 for the next period 166 corresponding to time $t_1$ to $t_2$. Thus, the system controller communicates an electrical load range 152 for the period 166 to the electrical power distribution system. A plurality of commands are then received from the electrical power distribution system 112 during the period 166. A rate of electrical energy consumption 163 by the group of energy storage devices 104 during the period 166 is then adjusted to a value within the electrical load range 152 responsive to each of the commands 140 using the system controller 102. A portion of the energy consumed by the group of energy storage devices 104 during the period 166 is stored in the mediums 110 of the devices 104. Additional embodiments of the method described above with regard to the period 154 are also applicable to the period 166.

In one embodiment, the system controller 102 determines an amount of energy that is consumed by the group of devices 104 during a given period of time, such as period 154 or 166. In some embodiments, this amount of consumed electrical energy is stored for future access, such as in the data store 124 or other location. In one embodiment, the system controller 102 communicates the amount of energy consumed by the group of energy storage devices 104 to the electrical distribution system 112. This provides verification to the electrical power distribution system 112 that electrical energy is being consumed by the group of energy storage devices 104 in accordance with the transmitted commands 140.

Unlike conventional systems that assist in load regulation through remote activation and deactivation of groups of devices under the control of a electrical power distribution system, embodiments of the method performed by the system 100 provide advance notice to the electrical power distribution system 112 of the amount of power that is available for regulation. This provides the electrical distribution system 112 greater control over the electrical load being supplied with energy.

Embodiments of the invention also allow energy to be distributed among the devices 104 as desired, such as in accordance with the needs of the devices 104 relative to other devices within the group. This provides the system 100 with the ability to provide load regulation service to the electrical power distribution system 112 while enabling the devices 104 to meet the demands of the user. Other benefits and advantages over the prior art are also provided by the system 100.

Although the present invention has been described with reference to preferred embodiments, workers skilled in the art will recognize that changes may be made in form and detail without departing from the spirit and scope of the invention. For example, the devices 104 may take on other forms other than the heating and battery charging devices described herein. Also, it is understood that while the schematic diagram of FIG. 1 may depict certain components as residing in or on a certain device, those components, or portions thereof, could be located outside or remotely from the device. For instance, the device controller 106, or components thereof, could be located remotely from the converter and medium while performing the functions described herein in accordance with embodiments of the invention.

What is claimed is:

1. A method of controlling electrical power consumption from an electrical power distribution system by a group of energy storage devices, the method comprising:

communicating a first electrical load range for a first period in the future to the electrical power distribution system using a controller comprising a processor;

receiving a plurality of commands from the electrical power distribution system during the first period using the controller;

adjusting a rate of electrical energy consumption by the group of energy storage devices during the first period to a value within the first electrical load range responsive to each of the commands using the controller; and storing a portion of the energy consumed by the group of energy storage devices in energy storage mediums of the devices during the first period.

2. The method according to claim 1, wherein the first period is during an off peak power consumption period and the power from the electrical power distribution system is generated using a renewable energy source.

3. The method according to claim 1, wherein:

the first period is divided into intervals; and receiving a plurality of commands from the electrical power distribution system during the first period comprises receiving each of the commands during a different interval of the first time period.

4. The method according to claim 3, wherein adjusting a rate of electrical energy consumption by the group of energy storage devices during the first period comprises adjusting the rate of energy consumption by the group of energy storage devices for the next interval in accordance with the command received during the preceding interval.

5. The method according to claim 3, wherein each of the intervals is 10 seconds or less.

6. The method according to claim 3, wherein:

each of the commands includes a commanded rate; and adjusting a rate of electrical energy consumption by the group of energy storage devices comprises setting the rate of energy consumption of the group of energy storage devices to the commanded rate for the interval of the first period corresponding to the command.

7. The method according to claim 6, wherein adjusting a rate of electrical energy consumption by the group of energy storage devices comprises unevenly distributing the commanded rate among the energy storage devices.

8. The method of claim 7, wherein:

the method comprises accessing a charge deficit for each of the energy storage devices using the controller; and adjusting a rate of electrical energy consumption by the group of energy storage devices comprises setting higher rates of electrical energy consumption for the devices having larger charge deficits than the devices having lower charge deficits.

9. The method according to claim 6, wherein the first electrical load range is a value indicating an average rate of energy consumption and the commanded rate is within a range of zero to twice the average rate.

10. The method according to claim 1, further comprising setting the first electrical load range comprising:

accessing a charge level forecast for the group of energy storage devices using the controller, the charge level forecast estimating a target charge level for each of the devices for the first period; and setting the first electrical load range based on the charge level forecast using the controller.

11. The method according to claim 1, further comprising setting the first electrical load range comprising:

accessing a charging schedule for the group of energy storage devices using the controller, the charging schedule identifying periods of time when the energy storage devices should consume electrical energy; and setting the first electrical load range based on the charging schedule using the controller.

12. The method according to claim 1, further comprising:

communicating a second electrical load range for a second period in the future to the electrical power distribution system using the controller;

receiving a plurality of commands from the electrical power distribution system during the second period using the controller;

adjusting a rate of electrical energy consumption by the group of energy storage devices during the second period to a value within the second electrical load range responsive to each of the commands using the controller; and storing a portion of the energy consumed by the group of energy storage devices in the energy storage mediums during the second period.

13. The method according to claim 1, further comprising:

determining an amount of energy consumed by the group of devices during the first period; and communicating the amount to the electrical distribution system.

14. A method of controlling the consumption of power from an electrical power distribution system by a group of energy storage devices comprising steps of:

controlling the group of energy storage devices at the onset of a first period to consume power from the electrical power distribution system using a controller comprising a processor;

receiving a command from the electrical power distribution system during a current interval of the first period using the controller;

adjusting a rate of electrical energy consumption by the group of energy storage devices during the next interval of the first period based on the command using the controller;

storing a portion of the energy consumed by the group of energy storage devices in energy storage mediums of the devices during the interval;

repeating the receiving, adjusting and storing steps until the expiration of the first period.

15. The method of claim 14, wherein the intervals of the first period are each less than 10 seconds.

16. The method according to claim 14, wherein adjusting a rate of electrical energy consumption by the group of energy storage devices comprises unevenly distributing electrical energy consumption among the energy storage devices.

17. The method according to claim 16, wherein:

the method comprises accessing a charge deficit for each of the energy storage devices using the controller, the charge deficit for each device corresponding to a remaining energy storage capacity of the energy storage medium of the device; and adjusting a rate of electrical energy consumption by the group of energy storage devices comprises setting higher rates of electrical energy consumption for the devices having larger charge deficits than the devices having lower charge deficits.

18. The method according to claim 17, further comprising:

determining an amount of energy consumed by the group of devices during the first period; and communicating the amount to the electrical distribution system.

19. The method according to claim 1, wherein:
each of the commands includes a commanded rate;
adjusting a rate of electrical energy consumption by the group of energy storage devices comprises setting the rate of energy consumption of the group of energy storage devices to the commanded rate for the interval of the first period corresponding to the command;
the method further comprising verifying to the electrical distribution system that the devices have consumed electrical energy at a rate in accordance with the commanded rate using the controller.

20. The method according to claim 1, further comprising verifying a rate of electrical energy consumption by the group of devices to the electrical power distribution system using the controller.

21. The method according to claim 14, wherein:
each of the commands includes a commanded rate;
adjusting a rate of electrical energy consumption by the group of energy storage devices comprises setting the rate of energy consumption of the group of energy storage devices during the next interval of the first period to the commanded rate;
the method further comprising verifying to the electrical distribution system that the devices have consumed electrical energy at a rate in accordance with the commanded rate using the controller.

22. The method according to claim 14, further comprising verifying a rate of electrical energy consumption by the group of devices to the electrical power distribution system using the controller.

* * * * *